(12) United States Patent
Ocket et al.

(10) Patent No.: US 7,639,095 B2
(45) Date of Patent: Dec. 29, 2009

(54) CIRCUIT AND METHOD FOR CONTACT-LESS TRANSMISSION

(75) Inventors: Tom Ocket, Torhout (BE); Joeri Fryns, Bruges (BE); Jan Van Cauwenberge, Aalter (BE); Michael Siotto, Deinze (BE)

(73) Assignee: Tyco Electronics Belgium EC N.V., Oostkamp (BE)

( * ) Notice: Subject to any disclaimer, the term of this patent is extended or adjusted under 35 U.S.C. 154(b) by 459 days.

(21) Appl. No.: 11/468,805

(22) Filed: Aug. 31, 2006

(65) Prior Publication Data

US 2007/0070951 A1    Mar. 29, 2007

(30) Foreign Application Priority Data

Sep. 28, 2005  (EP)  ................... 05021155
Oct. 17, 2005  (EP)  ................... 05022617

(51) Int. Cl.
*H03K 3/00*   (2006.01)
*H03B 7/02*   (2006.01)

(52) U.S. Cl. ............... 331/151; 307/10.1; 307/104; 331/113 R; 331/117 R; 331/144

(58) Field of Classification Search ............... 307/104, 307/10.1; 331/151, 113 R, 117 R, 144
See application file for complete search history.

(56) References Cited

U.S. PATENT DOCUMENTS

| 5,515,933 | A |  | 5/1996  | Meyer et al. |
| 5,618,056 | A |  | 4/1997  | Schoos et al. |
| 5,696,409 | A |  | 12/1997 | Handman et al. |
| 5,856,710 | A |  | 1/1999  | Baughman et al. |
| 5,892,300 | A | * | 4/1999  | Rydval ................ 307/104 |
| 5,898,579 | A | * | 4/1999  | Boys et al. ............ 363/23 |
| 5,942,815 | A | * | 8/1999  | Neuman et al. ........ 307/139 |
| 6,032,546 | A |  | 3/2000  | Stone |
| 6,362,734 | B1 |  | 3/2002  | McQuade et al. |
| 6,847,283 | B2 |  | 1/2005  | Schirmer |
| 6,882,162 | B2 |  | 4/2005  | Schimer et al. |

FOREIGN PATENT DOCUMENTS

WO    2004098943 A1    11/2004

* cited by examiner

*Primary Examiner*—Joseph Chang
(74) *Attorney, Agent, or Firm*—Barley Snyder LLC

(57) ABSTRACT

A system includes a first and second circuit electromagnetically coupled to establish a contact-less transmission, for example, between a vehicle body and a removable seat of the vehicle body. The first circuit includes a first inductor and the second circuit includes a second inductor. In order to detect in the first circuit the status of one or more input signals of the second circuit, the second circuit includes a signal generating portion including a resistor and a capacitor that generates, a time-pulsed signal. The second circuit is adapted to set a value of at least one of the resistor and the capacitor based on a sensed parameter and sets a duty cycle of the time-pulsed signal based on a value of at least one of the resistor and the capacitor. The time-pulsed signal changes a load of the second circuit over time which can be detected in the first circuit.

21 Claims, 4 Drawing Sheets

CIRCUIT AND METHOD FOR CONTACT-LESS TRANSMISSION

FIELD OF THE INVENTION

The present invention relates to a contact-less connection between electrical modules, and in particular a system having a first circuit and a second circuit electromagnetically coupled to establish a contact-less transmission, for example, between a vehicle body and a removable seat of the vehicle body or between a dashboard and a steering wheel, as a wireless clockspring.

BACKGROUND OF THE INVENTION

In many vehicles manufactured nowadays, removable seats are foreseen that comprise an electrical module adapted to communicate in a contact-less manner with another electrical module fixed on a vehicle body. A possible solution is to arrange a first module comprising a first inductor on the vehicle body and a second module comprising a second inductor on a removable seat. The first module and the second module are arranged on the vehicle body and on the removable seat, respectively, in such a way that a spacing between the first and second inductors, which form primary and secondary sides of a transformer, respectively, is relatively small, so that a coupling factor is high enough to provide for a sufficient magnetic coupling.

Such a system for contact-less transmission may also be implemented as a wireless clockspring of a vehicle. The clockspring, for example, is a device located between a steering column and a steering wheel of the vehicle that transfers signals from buttons on the steering wheel to the vehicle body to an air bag system in all of the steering wheel positions. This system comprises a first module with a first inductor arranged, for example, on the vehicle body and a second module with a second inductor arranged, for example, on the steering wheel. The first and second conductors are inductively coupled to form a contact-less clockspring.

In the systems according to the prior art, however, the quality of the signal received at the first module is often poor. There is therefore a need for an improved system establishing a contact-less transmission of signals between a first module and a second module.

BRIEF SUMMARY OF THE INVENTION

The object of the present invention is to provide a circuit and method allowing for an improved contact-less transmission of signals between two electrical modules.

According to a first embodiment of the present invention, a system is devised comprising a first circuit and a second circuit. The second circuit includes a signal generating portion for generating a time-pulsed signal. The signal generating portion includes a resistor and capacitor. The second circuit is adapted to set a value of at least one of the resistor and capacitor based on a sensed parameter and is further adapted to set a duty cycle of the time-pulsed signal based on the value of at least one of the resistor and capacitor.

Because the second circuit is adapted to set a value of at least one of the resistor or capacitor based on the sensed parameter, for example, a passenger presence on a removable seat of a vehicle or a fastening state of a seat-belt of the removable seat, in a system for contact-less transmission between a first and second module, determining the value of the resistance of the resistor or capacitance of the capacitor at the first module allows for determining a status of the sensed parameter at the second module.

The resistor may be foreseen in the form of a variable resistor, whose resistance value depends on the sensed parameter. Likewise, the capacitor may be foreseen in the form of a variable capacitor, whose capacitance value depends on the sensed parameter. Alternatively, the resistor may comprise a plurality of resistors that are added or removed from the second circuit as a function of a sensed parameter. Similarly, the capacitor may comprise a plurality of capacitors that are added or removed from the second circuit as a function of the sensed parameter.

The second circuit according to a first embodiment of the present invention is adapted to set a duty cycle of the generated time-pulsed signal based on the set value of at least one of the resistor and capacitor. This is advantageous since the duty cycle is a parameter that can be measured in a very reliable and stable manner, so that the output signal transmitted inductively from the second module to the first module may thus be received and processed by the first module with a high quality.

The signal generating portion may comprise an astable multivibrator circuit, which includes two bipolar or Field-Effect (FET) transistors. The resistor is connected to a base or gate of the two bipolar or FET transistors. Since the duty cycle of the astable multivibrator circuit is linked to the ratio of the resistance of the base resistor and the capacitance of the capacitor connected thereto, measuring the duty cycle of the signal output by the second module comprising the astable multivibrator circuit allows to retrieve information on the status of the sensed parameter.

The astable multivibrator circuit may also include two transistors and the second circuit a further transistor that is adapted to be switched conductively when one of the two transistors is switched conductively. The addition of the further transistor is advantageous, since it allows for amplifying the output signal that is transmitted by the second circuit via contact-less transmission. In particular, the further transistor allows for increasing the amplitude difference between a high level and a low level in the output signal of the second circuit. This allows in turn for an easier differentiation between the high level and the low level in the signal transmitted from the second module to the first module via the contact-less transmission, thus improving the measurement of the duty cycle and in turn the quality of the measurement of the sensed parameter.

According to yet another embodiment of the second circuit, the second circuit further comprises an inductor and a capacitor connected in series, wherein the inductor and the capacitor form a resonant circuit. In a case where the electromagnetic coupling factor between the first inductor of the first module and the second inductor of the second module has a sufficiently high value, for example, when a ferrite core is arranged in the second inductor, a further capacitor is not required. However, when the electromagnetic coupling is not good enough, foreseeing a further capacitor in series with the second inductor allows for amplifying the signal transmitted inductively.

According to a second embodiment of the present invention, a system is devised comprising a first circuit and a second circuit. The second circuit is provided with a signal generating portion comprising a resistor and capacitor that generates a pulse. The second circuit is adapted to set a value of at least one of the resistor and capacitor based on a sensed parameter, and is further adapted to set a time constant and/or amplitude of the pulse based on the value of at least one of the resistor and capacitor.

The second circuit is adapted to set a value of at least one of the resistor and capacitor based on a sensed parameter, for example, a passenger presence on a removable seat of a vehicle or a fastening state of a seat-belt of the removable seat. Indeed, in a system for contact-less transmission between a first and second module, determining the value of the resistance of the resistor or the capacitance of the capacitor at the first module allows for determining a status of the sensed parameter at the second module.

When the second circuit is adapted to generate an output signal as a pulse whose time constant and/or amplitude is based on the value of at least one of the resistor and capacitor, a system for establishing a contact-less transmission may be achieved that is particularly advantageous. Indeed, the status of a sensed parameter at the second module of the system may be determined by measuring the time constant and/or amplitude of the pulse received at the first module of the system. In particular, the time constant of such a pulse is related to the product of the resistance of the resistor and the capacitance of the capacitor. The amplitude is a function of the resistance of the resistor, the capacitance of the capacitor and a distance between the first module and the second module.

In the system according to the present invention the first circuit comprises a first inductor and the second circuit comprises a second inductor such that the first circuit and the second circuit are coupled electromagnetically. The first circuit is connectable to a signal generator, such as an alternating signal generator and is further adapted to generate a signal transmitted inductively to the second inductor of the second circuit. The second circuit is adapted to transmit the output signal to the first circuit in response to the exciting signal, wherein the output signal is dependent on the sensed parameter. The first circuit is adapted to detect a signal transmitted by the second circuit and to determine a sensed parameter based on the detected signal.

The system for establishing a contact-less transmission according to the present invention is particularly advantageous when implemented in a vehicle, in particular, when the first circuit is foreseen on a vehicle body and the second circuit is arranged on a removable seat or as a wireless clock-spring. When the second circuit is arranged on a removable seat, many different kinds of parameters, such as, for example, a passenger presence on the removable seat or the fastening state of a seat-belt of the removable seat, may be sensed using the contact-less transmission.

DETAILED DESCRIPTION OF THE INVENTION

Figure 1:
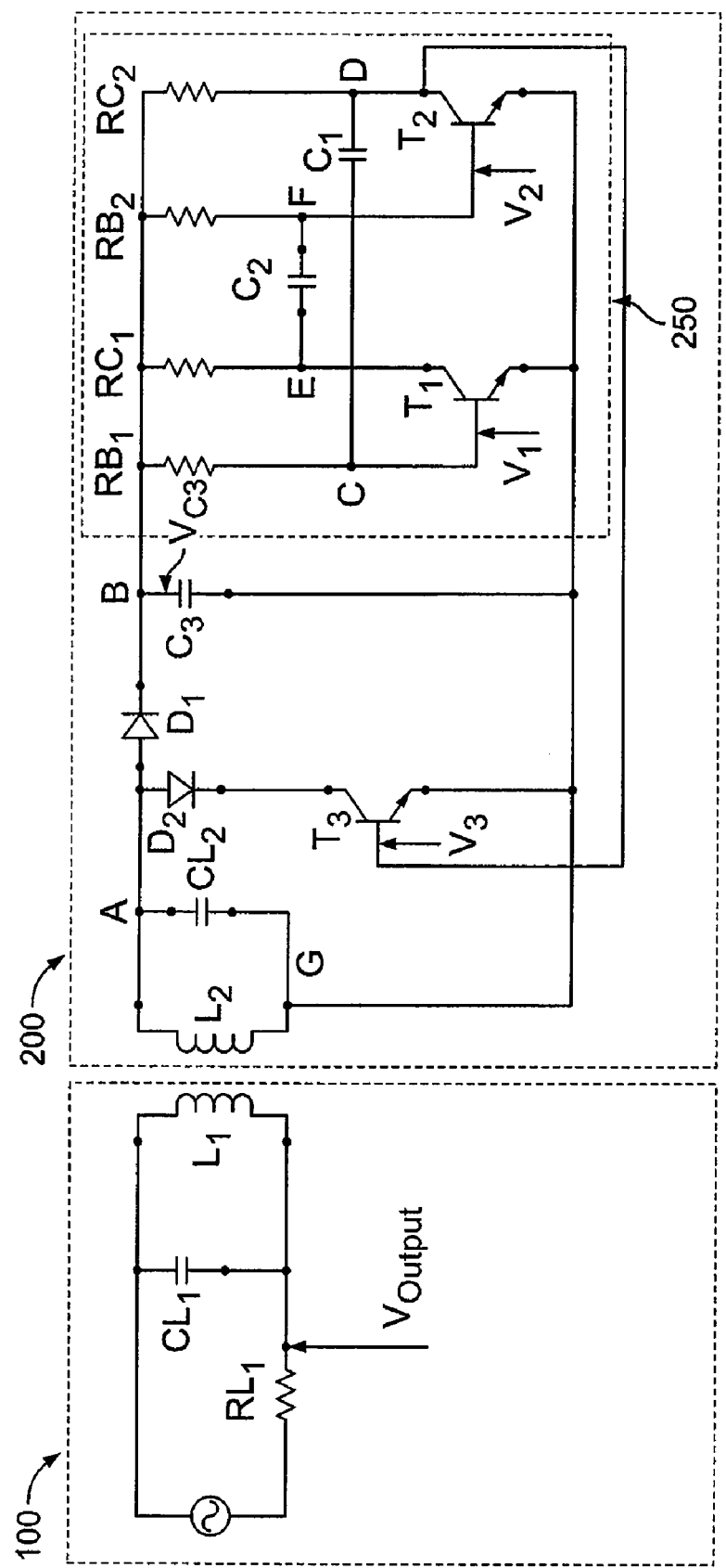
FIG. 1 is a simplified circuit diagram illustrating a system according to a first embodiment of the present invention.

FIG. 1 shows a system consisting of a first circuit 100 and a second circuit 200 for establishing a contact-less transmission according to a first embodiment of the present invention. The first circuit 100 (further circuit) comprises a first inductor $L_1$ while the second circuit 200 (circuit) comprises a second inductor $L_2$, so that the first circuit 100 and the second circuit 200 form, respectively, a primary and secondary circuit of a transformer. The first and second inductors $L_1$, $L_2$ therefore interact by a magnetic coupling.

The first circuit 100 is connectable to a signal generator, such as an alternating signal generator. The signal generator generates a signal which is transmitted inductively from the first inductor $L_1$ of the first circuit 100 to the second inductor $L_2$ of the second circuit 200. The second inductor $L_2$ of the second circuit 200 is part of a resonant circuit, which includes a capacitor $C_{L2}$ connected in parallel with the second inductor $L_2$. The signal transmitted inductively to the second inductor $L_2$ thus excites the resonant circuit which oscillates in response to the signal.

A rectifying element, such as a diode D1, is connected to the capacitor $C_{L2}$ of the resonant circuit. In particular, an anode of the diode D1 is connected to a connecting point A that is located between the second inductor $L_2$ and the capacitor $C_{L2}$. A cathode of the diode D1 is connected to a signal generating portion, such as an astable multivibrator circuit 250, so that the exciting signal received inductively by the resonant circuit is rectified by the diode D1 and then fed to the astable multivibrator circuit 250. The cathode of the diode D1 is connected in series with a capacitor C3. The series connection of the diode D1 and the capacitor C3 is connected in parallel with the capacitor $C_{L2}$ of the resonant circuit.

The astable multivibrator circuit 250 comprises cross-coupled transistors T1, T2 and a network of resistors $R_{B1}$, $R_{C1}$, $R_{B2}$, $R_{C2}$ and capacitors C1, C2. The transistors T1, T2 may be, for example, bipolar/FET transistors. The resistor $R_{B1}$ is connected between a connecting point B, located between the cathode of the diode D1 and the capacitor C3, and a base/gate of the transistor T1. The resistor $R_{C1}$ is connected between the connecting point B and a collector/drain of the transistor T1. The capacitor C1 is connected between a connecting point C, located between the resistor $R_{B1}$ and the base/gate of the transistor T1, and a connecting point D, located at a collector/drain of the transistor T2.

A resistor $R_{B2}$ is connected between the connecting point B and a base/gate of the transistor T2. A resistor $R_{C2}$ is connected between the connecting point B and the connecting point D located at the collector/drain of the transistor T2. The capacitor C2 is connected between a connecting point E, located between the resistor $R_{C1}$ and the collector/drain of the transistor T1, and a connecting point F, located between the resistor $R_{B2}$ and the base/gate of the transistor T2. An emitter/source of the transistors T1, T2 are connected with each other and connected to a connecting point G located between the second inductor $L_2$ and the capacitor $C_{L2}$ of the resonant circuit. The connecting point G is different from the connecting point A.

The collector/drain of the transistor T2 is further connected to a base/gate of an additional transistor T3, whose collector/drain is connected to the connecting point A via a diode D2 and whose emitter/source is connected to the connecting point G. The transistors T3 may be, for example, bipolar/FET transistor. An anode of the diode D2 is connected to the connecting point A and a cathode is connected to the collector/drain of the transistor T3.

The resistors $R_{B1}$, $R_{B2}$ and/or the capacitors C1, C2 may be implemented in the form of a variable resistor or a variable capacitor, respectively, wherein the value of the resistance or capacitance thereof is a function of a sensed parameter, such as, for example, a passenger presence on a removable seat of a vehicle or a fastening state of a seat-belt of the removable seat. Alternatively, the resistors $R_{B1}$, $R_{B2}$ and/or the capacitors C1, C2 may comprise a plurality of resistors and/or capacitors that are added or removed from the system as a function of the sensed parameter.

The signal output by the second circuit 200 is transmitted inductively by the second inductor L2 to the first inductor L1 of the first circuit 100 and excites a resonant circuit comprising the first inductor L1 and a capacitor $C_{L1}$. The excitation signal is then measured at a resistance $R_{L1}$ connected in series with the signal generator. The series connection is connected in parallel with the resonant circuit.

The working principle of the system consisting of the first circuit 100 and the second circuit 200 according to the present invention will be explained in more detail in FIG. 2, which is a graph showing the time evolution of a plurality of voltages measured in the first circuit 100 and the second circuit 200. Specifically, in FIG. 2, an output signal $V_{output}$ measured at the resistor $R_{L1}$ after a low-pass filter (not shown) is represented over time. The voltage at the capacitor C3 of the second circuit 200, the voltage V1 at the base/gate of the transistor T1, the voltage V2 at the base/gate of the transistor T2, and the voltage V3 at the base/gate of the transistor T3 are represented over time. The voltages represented in FIG. 2 are measured with respect to a ground potential taken at the connecting point G.

According to the present invention, the excitation signal in the second circuit 200 is rectified by the diode D1 and then applied to the capacitor C3, whose capacitance value is much larger than the capacitance values of the capacitors C1, C2. Hence, as illustrated in FIG. 2, the voltage at the capacitor C3 has very little variation in comparison to the variations of the voltages V1, V2, V3. It may thus be considered that once the capacitor C3 is charged, the voltage is approximately constant, so that a supply voltage $V_{C3}$ is applied to the astable multivibrator circuit 250 according to the present invention.

In the astable multivibrator circuit 250, the outputs of the first transistor T1 and the second transistor T2 are complementary. The astable multivibrator circuit 250 has two stable states and switches back and forth from one state to another, remaining in each state for a time depending upon the discharging of the capacitors C1, C2.

Figure 2:
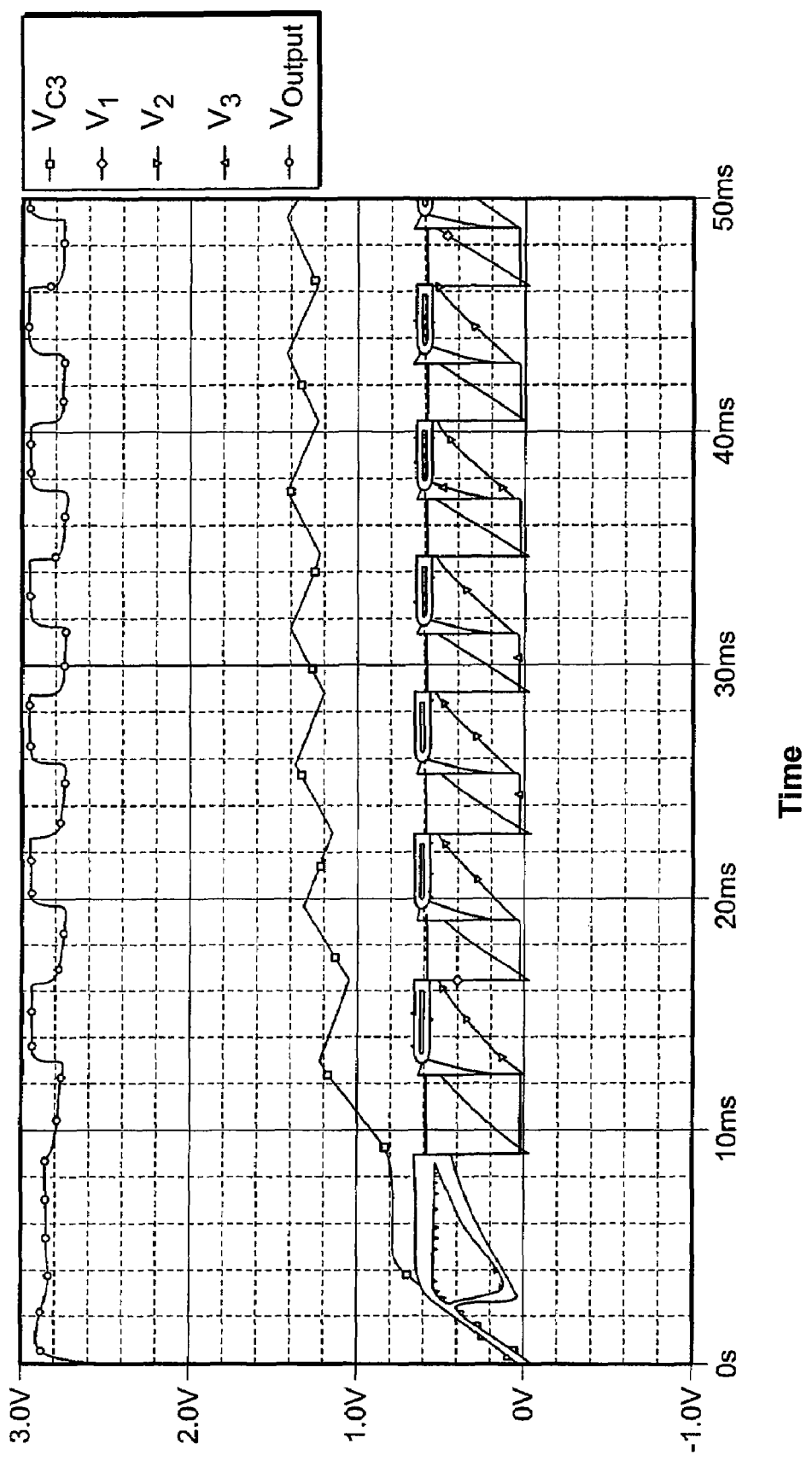
FIG. 2 is a graph showing the time evolution of different voltages in the system according to the first embodiment of the present invention.

As can be seen in FIG. 2, after a transitional period, the voltage V2 is equal to the voltage between the base/gate and the emitter/source of the transistor T2, so that the transistor T2 is switched on and the voltage V1 drops down, so that the transistor T1 is switched off. The voltage V3 at the base/gate of the transistor T3 is at 0 Volts, so that the transistor T3 is switched off. The conditions, as mentioned above, shall define the initial state, from which the evolution of the voltages will now be considered.

In a first period, the capacitor C1 is charged under the supply voltage $V_{C3}$ through the resistor $R_{B1}$, so that the voltage V1 at the capacitor C1 increases with a time constant $R_{B1}*C1$ until the voltage V1 reaches the value of the voltage between the base/gate and the emitter/source of the transistor T1 at which the transistor T1 conducts. Meanwhile, the transistor T2 is still switched conductively and the voltage V2 is equal to the voltage between the base/gate and the emitter/source of the transistor T2 at which the transistor T2 conducts. Since the transistor T1 is not switched conductively during this period, there is no current flowing through the resistor $R_{C1}$ and thus no voltage drop at the resistor $R_{C1}$. When the capacitor C1 is charged enough, so that the voltage V1 reaches the value of the voltage between the base/gate and the emitter/source of the transistor T1, the transistor T1 is switched on. As a result, the current flows through the resistor $R_1$ through the transistor T1. The voltage V2 drops down and the transistor T2 is switched off.

In a second period, the transistor T1 is switched conductively, so that the voltage V1 is equal to the voltage between the base/gate and the emitter/source of the transistor T1. Since the transistor T2 is switched off in this period, there is no current flowing through the resistor $R_{C2}$ and thus no voltage drop at the resistor $R_{C2}$. During this period, the capacitor C2 is charged under the supply voltage $V_{C3}$ through the resistor $R_{B2}$. The voltage V2 thus increases with a time constant $R_{B2}*C2$. As in the first period, when the voltage V2 at the capacitor C2 reaches the voltage between the base/gate and the emitter/source of the transistor T2, the transistor T2 is switched on. When the transistor T2 is switched on, the voltage V1 at the base/gate of the transistor T1 drops down and the transistor T1 is switched off. Afterwards, the processes may repeat indefinitely.

As can be seen in FIG. 2, the transistor T3 is switched conductively when the transistor T1 is switched conductively, for example, when the transistor T2 is switched off. Indeed, when the transistor T2 is not conductive, there is no current flowing through the resistor $R_{C2}$, so that the supply voltage $V_{C3}$ is applied to the collector/drain of the transistor T2. Since the collector/drain of the transistor T2 is connected to the base/gate of the transistor T3, the high potential at the collector/drain of the transistor T2 is enough for reaching the voltage between the base/gate and the emitter/source of the transistor T3, thus switching it conductively. However, when the transistor T2 is switched conductively, the voltage drop across the transistor T2 is no longer enough to switch the transistor T3 conductively and the transistor T3 is thus switched off.

As can be seen in FIG. 2, the output voltage $V_{output}$ of the signal received at the first circuit 100 has high and low levels, which correspond to the high and low levels of the voltage V3. In particular, the duty cycle and frequency of the output signal $V_{output}$ corresponds to the duty cycle and the frequency of the voltage V3. Since the on and off switching times of the output signal $V_{output}$ are directly linked to the value of the resistance of the resistors $R_{B1}$, $R_{B2}$ as well as the value of the capacitance of the capacitors C1, C2, measuring the on and off switching times allows for determining the status of a sensed parameter, which is reflected by the value of the resistance of the resistors $R_{B1}$, $R_{B2}$ and the capacitance of the capacitors C1, C2.

Figure 3:
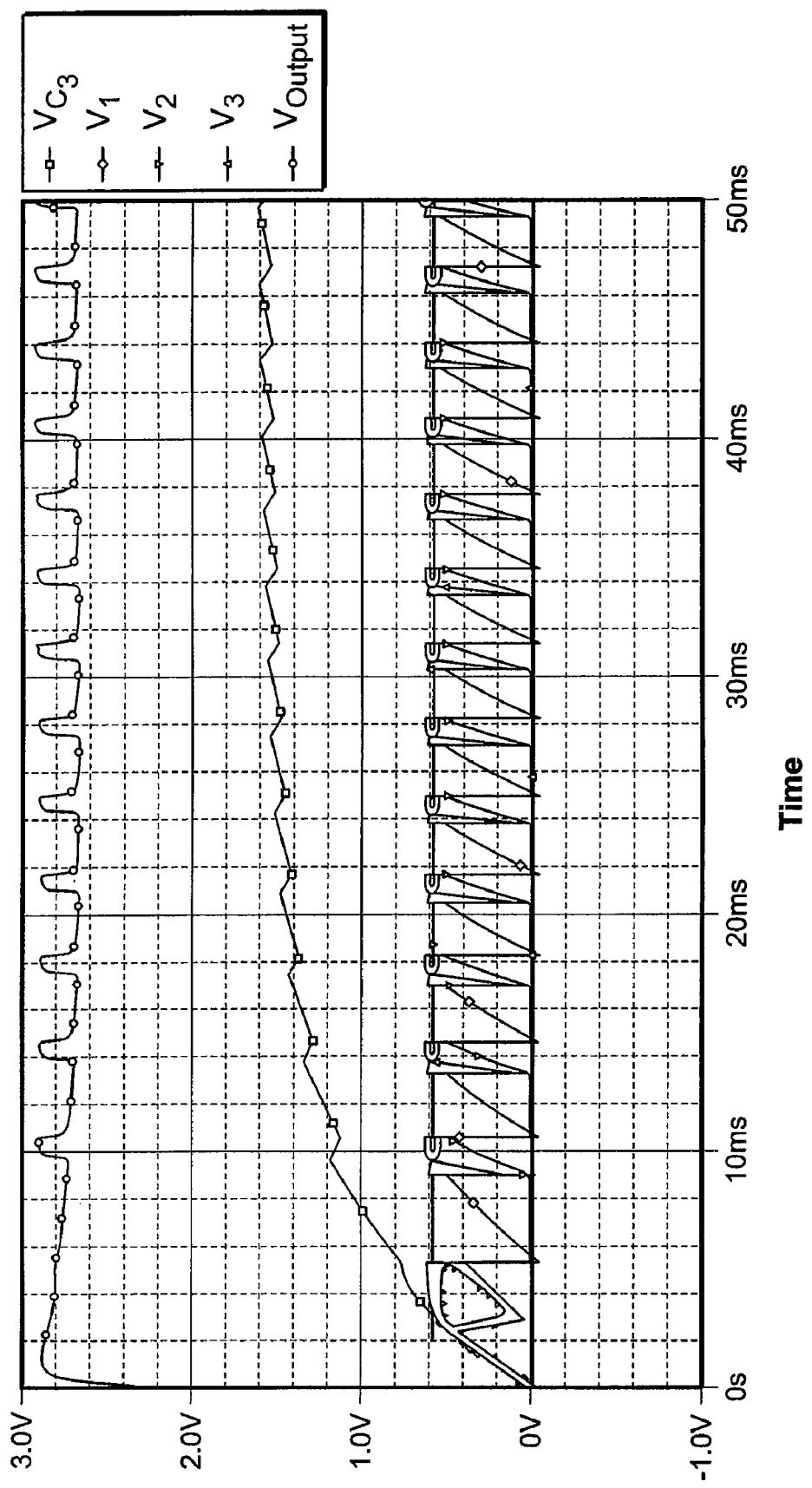
FIG. 3 is a graph showing the time evolution of different voltages in the system according to the first embodiment of the present invention, wherein a resistor in the astable multivibrator circuit has been given a different value than in FIG. 2.

FIG. 3 is a graph showing the time evolution of the voltages $V_{C3}$, V1, V2, V3, $V_{output}$ in the first circuit 100 and the second circuit 200, wherein a parameter has been changed with respect to FIG. 2. Indeed, in the simulation shown in FIG. 3, the value of the resistance of the resistor $R_{B2}$ is about three times smaller than the value of the resistance of the resistor $R_{B2}$, as shown in the representation of FIG. 2. Since the value of the resistance of the resistor $R_{B2}$ is about three times smaller in FIG. 3 than in FIG. 2, the time constant necessary to charge the capacitor C2 is thus about three times smaller than the corresponding time constant in the representation of FIG. 2. Since the time necessary to switch the transistor T2 is reduced in comparison to the representation in FIG. 2, the output signal $V_{output}$ received at the first circuit 100 has therefore high levels whose duration is reduced in comparison to the duration of the high levels in FIG. 2.

Even though the second circuit 200 is described as having a signal generating portion in the form of the astable multivibrator circuit 250, another circuit portion may be foreseen, provided that the circuit portion fulfils the technical function of generating a time-pulsed signal whose duty cycle depends on the resistance of a resistor and/or the capacitance of a capacitor of the second circuit 200. For example, the circuit portion may be a signal generating portion such as a multivibrator circuit or another kind of timer circuit. The signal generating portion may also comprise at least one timer chip, as long as the signal generating portion generates a time-pulsed signal whose duty cycle depends on the resistance of the resistor and/or the capacitance of the capacitor of the second circuit 200. Additionally, although the second circuit 200 is described as comprising the astable multivibrator circuit 250, another kind of multivibrator circuit may be foreseen, such as, for example, a monostable multivibrator circuit. In this case, only one pulse will be generated.

Figure 4:
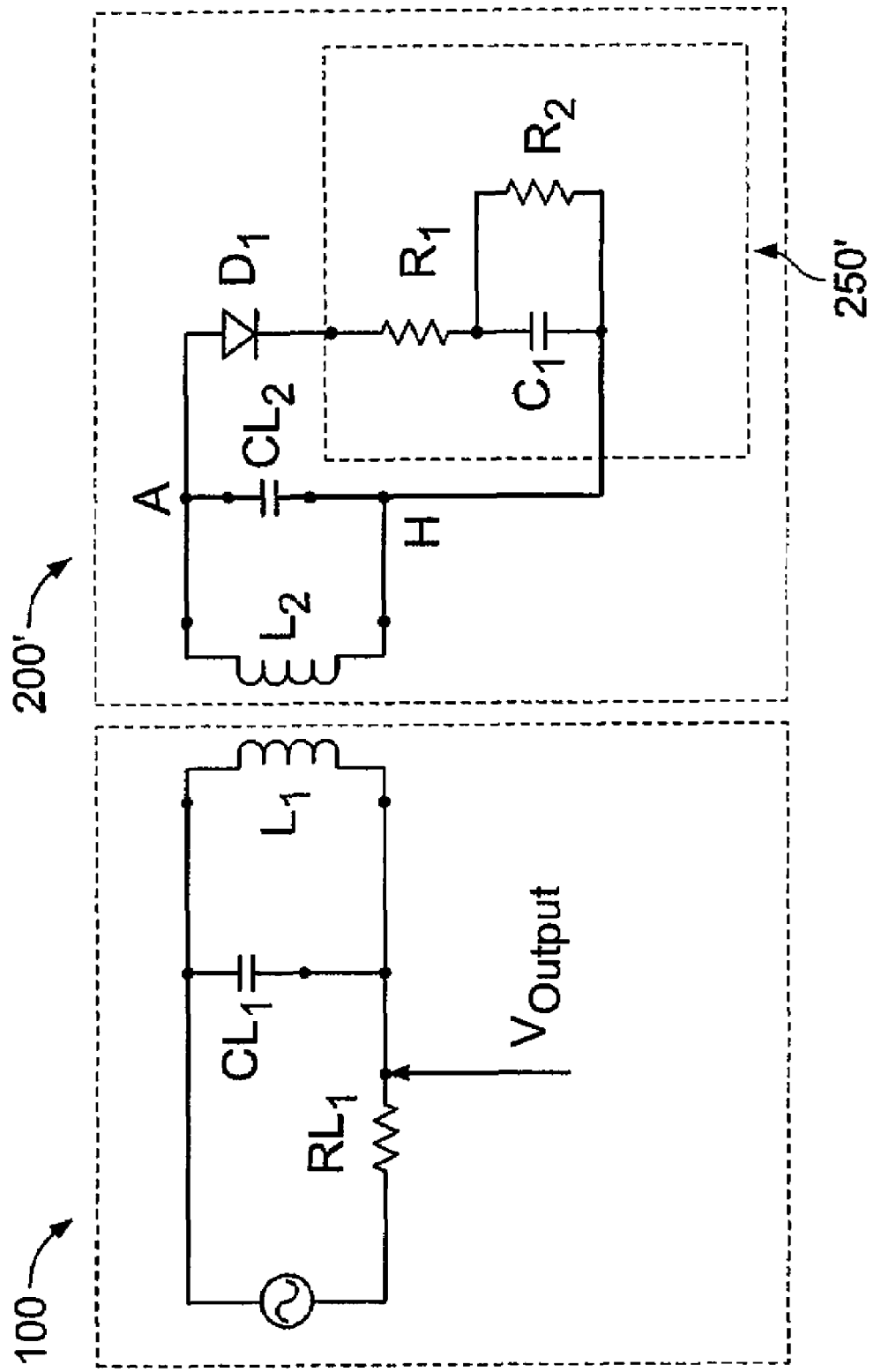
FIG. 4 is a simplified circuit diagram illustrating a system according to a second embodiment of the present invention.

FIG. 4 shows a system consisting of a first circuit 100 and a second circuit 200' according to a second embodiment of the present invention. Since the first circuit 100 is substantially identical to the first circuit 100 described with respect to FIG. 1, further description of elements thereof will be omitted hereafter.

The second circuit 200' comprises an inductor L2 which forms a resonant circuit with a capacitor $C_{L2}$. A rectifying element, such as a diode D1, is arranged in such a way that the diode D1 rectifies an excitation signal output by the resonant circuit. An anode of the diode D1 is connected to a connection point A, which is located between the inductor L2 and the capacitor $C_{L2}$. A cathode of the diode D1 is connected to a resistor R1. A capacitor C1 is connected in series with the resistor R1 and to a connecting point H, which is located between the inductor L2 and the capacitor $C_{L2}$. The connecting point H is different from the connecting point A. A resistor R2 is connected in parallel with the capacitor C1.

According to the present invention, the circuit 200' sets a value of the resistance of the resistor R1 or capacitance of the capacitor C1, or both, in response to a sensed parameter, such as, for example, a passenger presence on a removable seat of a vehicle or a fastening state of a seat belt of the removable seat. Consequently, the status of the sensed parameter may be reflected by the value of the resistance of the resistor R1 and/or the capacitance of the capacitor C1.

An example of a working principle of the system consisting of the first circuit 100 and the second circuit 200' will now be explained. The first circuit 100 is connectable to a signal generator, preferentially an alternating signal generator, wherein the signal generator generates an exciting signal that is transmitted inductively from the first inductor L1 to the second inductor L2 of the second circuit 200', thus exciting the resonant circuit. The exciting signal received at the second circuit 200' is then rectified by the diode D1 and the rectified signal is then applied to the series connection of the resistor R1 and the capacitor C1. The capacitor C1 is thus charged with a time constant equal to the product of the resistance of the resistor R and capacitance of the capacitor C1. A pulse signal is generated and reflects the changing load of the second circuit 200', which is seen on the primary side at the first circuit 100, because the power consumption of the first inductor L1 changes over time.

The received output signal $V_{output}$ is measured after a low-pass filter of the voltage at the resistor $R_{L1}$ of the first circuit 100. The output signal $V_{output}$ is analyzed to determine the time constant and/or the amplitude of the pulse. Since the time constant is related directly to the value of the resistance of the resistor R1 and the capacitance of the capacitor C1, the status of a sensed parameter may be determined. Furthermore, since the amplitude of the pulse is a function of the resistance of the resistor R1 and the capacitance of the capacitor C1, as well as the distance separating the first circuit 100 and the second circuit 200', the status of the sensed parameter may also be determined by measuring the amplitude of the pulse.

Alternatively, the sensed parameter may be reflected by setting the value of the resistance of the resistor R2. In this case, the unloading time of the capacitor C1 is measured at the first circuit 100 to determine the status of the sensed parameter.

The circuit portion of the second circuit 200' comprising the resistor R1 and the capacitor C1, generates a pulse whose time constant and amplitude is dependent on the value of the resistance of the resistor R1 and the capacitance of the capacitor C1. Hence, since the value of the resistance of the resistor R1 and/or the capacitance of the capacitor C1 depends on a sensed parameter, the circuit portion is a signal generating portion 250' that generates a pulse whose time constant and amplitude is dependent on a sensed parameter. Consequently, the signal generating portion 250' of the second circuit 200' and the astable multivibrator circuit 250 of the second circuit 200 that generates a time-pulsed signal whose duty cycle and frequency depends on a sensed parameter, fulfill a similar technical function.

The foregoing illustrates some of the possibilities for practicing the invention. Many other embodiments are possible within the scope and spirit of the invention. For example, even though the system according to the present invention is described as comprising the first circuit 100 and the second circuit 200, 200', wherein the first circuit 100 comprises the first inductor L1 and the second circuit 200, 200' comprises the second inductor L2, the first and second inductors L1, L2 in each of the first and second circuits 100, 200, 200' may be replaced by an antenna, for example, in the case of an application requiring transmitting high frequency signals between the first and second circuits 100, 200, 200'. It is, therefore, intended that the foregoing description be regarded as illustrative rather than limiting, and that the scope of the invention is given by the appended claims together with their full range of equivalents.

What is claimed is:

1. A system having a circuit comprising:
    a resonant portion including an inductor and a capacitor;
    a signal generating portion that generates a time-pulsed signal, the signal generating portion including a resistor and a capacitor;
    the circuit being adapted to set a value of at least one of the resistor and the capacitor of the signal generating portion based on a sensed parameter; and
    the circuit being adapted to set a duty cycle of the time-pulsed signal based on the value of at least one of the resistor and the capacitor of the signal generating portion.

2. The system of claim 1, wherein the signal generating portion is an astable multivibrator circuit.

3. The system of claim 2, wherein the astable multivibrator circuit includes at least two bipolar transistors and at least two of the resistors, each of the resistors being connected to a base of one of the bipolar transistors.

4. The system of claim 2, wherein the astable multivibrator circuit includes at least two field-effect transistors and at least two of the resistors, each of the resistors being connected to a gate of one of the field-effect transistors.

5. The system of claim 2, wherein the duty cycle is dependant on a ratio of a resistance of the resistor and a capacitance of the capacitor of the signal generating portion.

6. The system of claim 2, wherein the astable multivibrator circuit includes at least two transistors and a further transistor adapted to be switched conductively when one of the two transistors is switched conductively.

7. The system of claim 1, further comprising a rectifying element that rectifies an output signal of the resonant portion.

8. The system of claim 1, further comprising a further circuit, the further circuit having a first inductor coupled to the inductor of the resonant circuit, the first inductor being electromagnetically coupled to the inductor of the resonant portion to establish a contact-less transmission there between.

9. The system of claim 8, wherein the further circuit is connected to a signal generator and is adapted to generate an exciting signal that excites the resonant portion.

10. The system of claim 9, wherein the further circuit is adapted to detect a signal transmitted by the circuit and is adapted to determine a sensed parameter based on the signal.

11. The system of claim 9, wherein the circuit is adapted to transmit an output signal to the further circuit in response to the exciting signal, the output signal being dependant on a sensed parameter.

12. The system of claim 8, wherein the circuit is arranged on a removable seat of a vehicle and the further circuit is arranged on the vehicle body.

13. A system having a circuit comprising:
a resonant portion including an inductor and a capacitor connected in series;
a signal generating portion that generates a pulse, the signal generating portion including a resistor and a capacitor;
the circuit being adapted to set a value of at least one of the resistor and the capacitor of the signal generating portion based on a sensed parameter; and
the circuit being adapted to set a time constant or an amplitude of the pulse based on the value at least one of the resistor and the capacitor of the signal generating portion.

14. The system of claim 13, further comprising a rectifying element that rectifies an output signal of the resonant portion.

15. The system of claim 13, further comprising a further circuit, the further circuit having a first inductor coupled to the inductor of the resonant portion, the first inductor being electromagnetically coupled to the inductor of the resonant portion to establish a contact-less transmission there between.

16. The system of claim 15, wherein the further circuit is connected to a signal generator and is adapted to generate an exciting signal that excites the resonant portion.

17. The system of claim 16, wherein the further circuit is adapted to detect a signal transmitted by the circuit and is adapted to determine a sensed parameter based on the signal.

18. The system of claim 16, wherein the circuit is adapted to transmit an output signal to the further circuit in response to the exciting signal, the output signal being dependant on a sensed parameter.

19. The system of claim 15, wherein the circuit is arranged on a removable seat of a vehicle and the further circuit is arranged on the vehicle body.

20. A method of electromagnetically coupling a circuit to a further circuit to establish a contact-less transmission there between, comprising the steps of:
providing the circuit with a signal generating portion having a resistor and a capacitor;
generating a time-pulsed signal;
setting a value of at least one of the resistor and the capacitor of the signal generating portion based on a sensed parameter; and
setting a duty cycle of the time-pulsed signal based on a value of at least one of the resistor and the capacitor.

21. A method of electromagnetically coupling a circuit to a further circuit to establish a contact-less transmission, comprising the steps of:
providing the circuit with a signal generating portion having a resistor and a capacitor; generating a pulse;
setting a value of at least one of the resistor and the capacitor of the signal generating portion based on a sensed parameter; and
setting a time constant or an amplitude of the pulse based on a value of at least one of the resistor and the capacitor.

* * * * *